United States Patent [19]

Johnson, Jr.

[11] 4,297,962
[45] Nov. 3, 1981

[54] HINGED DECK CLEAT ASSEMBLY

[75] Inventor: Curtiss S. Johnson, Jr., Middle Haddam, Conn.

[73] Assignee: C. Sherman Johnson Company, Inc., East Haddam, Conn.

[21] Appl. No.: 54,473

[22] Filed: Jul. 3, 1979

[51] Int. Cl.³ ............................................. B63B 21/04
[52] U.S. Cl. ...................................... 114/218; 16/126; 248/499
[58] Field of Search ...................... 16/126, 1; 114/218; 24/115 J, 115 K; 105/484, 480; 248/499; 410/101, 111, 107

[56] References Cited

U.S. PATENT DOCUMENTS

| | | | |
|---|---|---|---|
| 235,299 | 12/1880 | Routh | 16/126 |
| 390,351 | 10/1888 | Dixon | 16/126 |
| 565,292 | 8/1896 | Mohr | 16/126 |
| 1,402,496 | 1/1922 | Hoffman | 114/218 |
| 2,555,805 | 6/1951 | Miller | 114/218 |
| 3,158,284 | 11/1964 | Henchert et al. | 16/126 X |
| 3,412,693 | 11/1968 | Lewis | 105/484 |
| 3,893,399 | 7/1975 | Lewis | 24/115 K X |

FOREIGN PATENT DOCUMENTS 73590 2/1932 Sweden ............................ 114/218

Primary Examiner—Andrew V. Kundrat
Attorney, Agent, or Firm—McCormick, Paulding & Huber

[57] ABSTRACT

A hinged cleat assembly for the deck of boats and the like is comprised by a T-shaped cleat formed by a contoured rod with two opposed, U-shaped ears interconnected at a midpoint of the cleat and two stem sections connected with the ears. A base plate is connected to the depending ends of the stem sections by means of a hinge which allows the cleat to be folded from an operative, upright position to a folded position relative to the deck.

9 Claims, 3 Drawing Figures

HINGED DECK CLEAT ASSEMBLY

BACKGROUND OF THE INVENTION

The present invention relates to a hinged deck cleat assembly with a cleat that may be folded to a flat position when not in use to avoid fouling of lines or interfering with sails and personnel moving about the deck of a boat.

In present day boats, particularly sailboats used in racing, designers are going to great lengths to provide clear decks and prevent fouling of sails and lines. Conventional cleats which are fixed in position on the decks are one source of fouling. Additionally deck cleats may interfere with the movement of personnel and can cause injury or falls due to their presence in deck areas of high activity.

Collapsible cleats for use on boats are shown in U.S. Pat. Nos. 1,402,496 to Hoffman and 2,555,805 to Miller. These prior art cleats are mounted in recessed relationship to the deck surface and correspondingly require cavities or holes to be formed in the deck. Also, the prior art cleats are assembled in a relatively complex unit which entails a number of manufacturing operations and corresponding expenses.

It is according the general object of the present invention to provide a cleat assembly that may be pivoted between an operative, upright position on the deck of a boat and a flattened position when not in use. It is a further object of the invention to provide a hinged cleat assembly that is relatively simple in construction and can be mounted on a flat deck surface.

SUMMARY OF THE INVENTION

The present invention resides in a hinged cleat assembly for the deck of a boat or the like. The assembly includes a base plate that is mounted on a boat without cutting a recess or hole in the deck surface and a cleat member connected to the plate by a hinge.

The cleat member is formed in the shape of a "T" by an elongated rod or other member contoured in an open form with two opposed ears to which lines are connected when in use. The cleat member has a supporting stem intermediate the ears and is connected to the base plate by means of the hinge. The hinge allows the cleat to pivot between an upright position for attaching lines and a flat position relative to the deck surface.

The hinging feature of the cleat allows lines to be attached to the cleat as needed but also provides a deck relatively free of obstructions that may foul lines or sails when the cleat is not in use. Also, the hinging feature allows the cleat to align itself with loads applied by lines fastened to the cleat without associated load-bearing chocks which also interrupt clear deck areas. With the open form or construction, the cleat may also be used to attach halyards and other lines with snap connectors.

DESCRIPTION OF PREFERRED EMBODIMENTS

Figure 1:
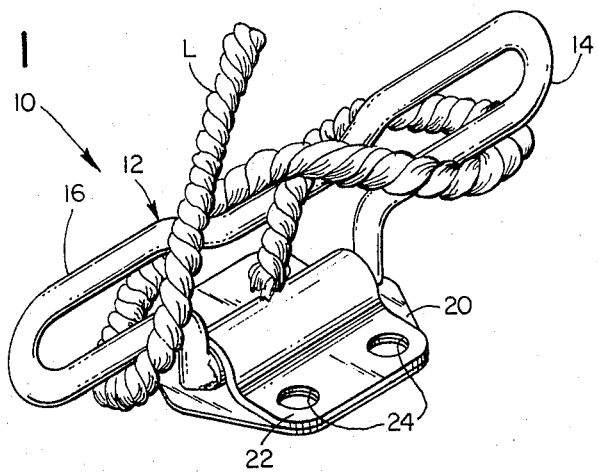
FIG. 1 is a perspective view of the hinged deck cleat assembly of the present invention.

FIG. 1 illustrates the hinged deck cleat assembly of the present invention. The cleat assembly is used for fastening lines L which can be hitched around the ears 14 and 16 of the cleat 12 as illustrated in conventional fashion. The cleat 12 is connected to the deck of a boat by means of a base plate 20 and a hinge plate 22, both of which contain registering mounting holes 24 through which screws or other fasteners may be inserted into an underlying deck.

Figure 2:
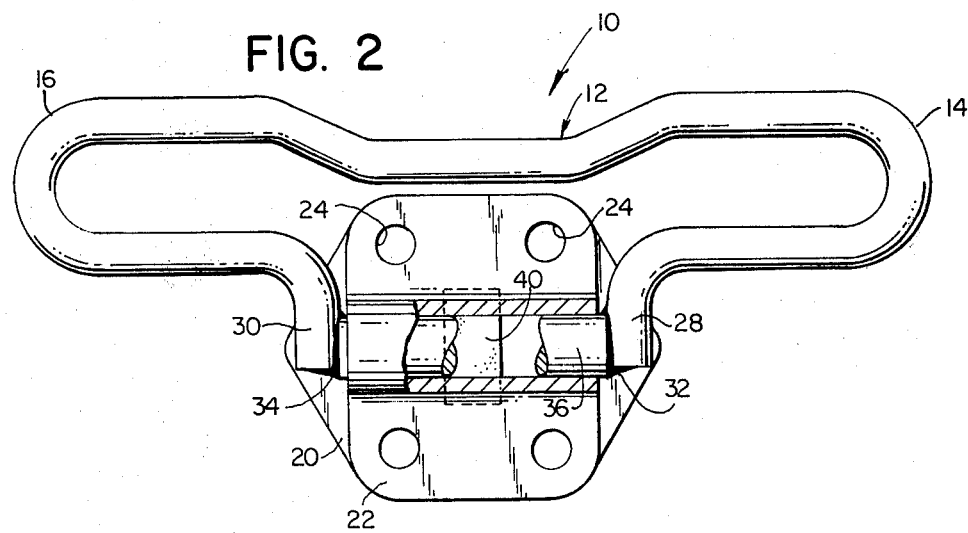
FIG. 2 is a top plan view of the hinged deck cleat assembly shown in a folded position.
Figure 3:
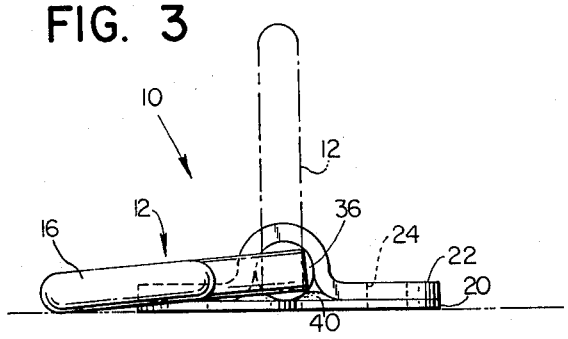
FIG. 3 is an end view of the hinged deck cleat assembly showing the cleat in its folded position and the upright position in phantom.

FIGS. 2 and 3 illustrate the components of the hinged deck cleat assembly 10 in greater detail. As shown in FIG. 2, the cleat 12 is an open form cleat formed by an elongated rod preferably having a circular cross section. In one embodiment the rod is stainless steel in order to withstand exposure to the elements and particularly salt water which may wash across boat decks during sailing.

The rod forming the cleat 12 is bent or contoured to form the two opposed, symmetric, U-shaped ears 14 and 16 which are interconnected at the midportion of the cleat. The interconnected ends of the ears 14 and 16 define an inwardly extending, outwardly facing depression on the exterior of the cleat to accommodate a line crossed in a hitch as shown in FIG. 1. A stem section 28 of the rod projects at a right angle from the adjacent portion of the ear 14, and a corresponding stem section 30 projects at a right angle from the adjacent portion of the ear 16. The sections 28 and 30 extend in parallel relationship with each other at each side of the hinge plate 22 and are connected by welds 32 and 34 with another section of rod forming a hinge pin 36 for the cleat 12. The hinge pin 36 extends through a conforming portion of the hinge plate 22, partially broken away in FIG. 2, to form a hinge which allows the cleat 12 to be pivoted between a folded or flattened position illustrated in FIG. 3 in solid lines and an upright position shown in phantom. It will be observed that the base plate 20 acts as a bearing surface for hinge pin 36 and prevents the pin and cleat from bearing directly on the deck when under load.

FIGS. 2 and 3 also illustrate a friction pad 40 bonded or otherwise attached to the base plate 20 and positioned in frictional engagement with the hinge pin 36 to hold the cleat 12 in an upright position when desired. The friction pad may, for example, be a foamed rubber strip that is sufficiently resilient to conform to the rounded pin 36 as shown in FIG. 3 and provide limited resistance to hinge movement.

The construction of the cleat 12 with an open form defines a large central opening extending from the stem of the cleat defined by the sections 28 and 30 into each of the opposed ears 14 and 16. This open construction offers a number of advantages not found in the prior art cleats. For example, a line may be attached to the cleat with the conventional hitch illustrated in FIG. 1 and also by passing a spliced loop through the central opening with a bite around the ears. Such fastening is particularly handy for dock lines extending to a boat deck. The open construction is also convenient for attaching other lines such as halyards, guys, tow lines and other lines with snap or clevis type connectors, and allows the assembly to serve as a combination handle and cleat for lifting and carrying a small boat or dinghy. Further, the cleat may simply be used as a handle for grasping and holding on to the deck.

The hinge feature is one of the more important features of the cleat assembly since it allows the cleat to be used for attachment purposes, and when not in use, permits the cleat 12 to be folded flat against the deck. In the flattened position, the cleat prevents fouling of lines or sails running about the deck and provides an obstruction-free surface on the deck. In addition to folding to a flattened position, the hinged cleat will pivot to intermediate positions in alignment with loads applied to the cleat by attached lines, which reduces the loading on components and fasteners attaching the assembly to a deck.

Accordingly, a hinged deck cleat assembly has been provided which is simple in construction and offers a number of advantages not found in the prior art.

While the present invention has been disclosed in a preferred embodiment, it should be understood that numerous modifications and substitutions can be had without departing from the spirit of the invention. For example, the precise contour of the cleat 12 illustrated in the drawings may be varied without losing the hinged or open form construction of the cleat. Other hinge constructions fastening the T-shaped cleat to a mounting plate or base may also be utilized. The stainless steel material is advantageous, particularly in salt water environments, but other materials may be found suitable where resistance to corrosion or strength is of lesser importance. Accordingly, the present invention has been described in a preferred embodiment by way of illustration rather than limitation.

I claim:

1. A hinged cleat assembly for the deck of a boat or the like comprising:

a base plate mountable on the deck surface of a boat;

a cleat member formed by a rod contoured in the shape of a "T" with two opposed projecting ears extending in opposite directions away from a supporting stem intermediate the ears, the ears being interconnected in the intermediate region and each ear having the shape of an elongated "U" to define a central opening extending into the ear from the intermediate region and to attach to the cleat member a line in a conventional hitch, the ears being contoured at their interconnection in the intermediate region of the cleat member to form an outwardly facing depression on the exterior of the cleat member; and hinge means connecting the stem of the cleat member to the base plate for pivoting movement of the cleat member between an upright and a flattened position relative to the base plate.

2. A hinged deck cleat assembly as defined in claim 1 wherein:

the stem of the cleat member is comprised by two rod sections connected respectively with the two opposed ears; and the hinged means includes a hinge pin connected to each of the sections comprising the stem.

3. In combination with the deck of a boat or the like, an improved deck cleat assembly comprising:

a base member connected to the deck of the boat or the like for mounting the cleat assembly;

a cleat having a T-shape with two opposed elongated U-shaped ears and a central stem portion depending from the ears;

hinge means connecting the depending stem portion to the base member for pivotal movement of the cleat between an upright and a folded position relative to the deck; and a friction member positioned within the hinge means and resisting the pivotal movement of the cleat stem portion to hold the cleat in the upright position relative to the deck.

4. A deck cleat assembly as defined in the combination of claim 3 wherein the hinge means is comprised by a hinge pin connected to the stem portion of the cleat and the friction member is positioned in frictional engagement with the hinge pin.

5. A deck cleat assembly as defined in the combination of claim 4 wherein:

the central stem portion of the cleat is formed by two spaced stem sections connecting respectively with the two opposed ears of the cleat; and the hinge pin extends between the two spaced stem sections.

6. A hinged deck cleat assembly comprising:

an open form cleat formed by an elongated contoured member in the shape of a T defining two opposed, symmetric, U-shaped ears each interconnected at the midportion of the cleat and with two stem sections each projecting in parallel relationship from the respective ears at the midportion, each of the opposed, U-shaped ears extending away from the other and from the two stem sections at the midportion of the cleat and being of sufficient extent that a line may be looped around each of the ears in crossing relationship at the midportion to attach the line to the cleat in a conventional hitch, the cleat having an inwardly extending, outwardly facing depression on the exterior of the midportion where the ears are interconnected to accommodate a line crossed in a hitch;

a mounting member for connecting the assembly to a deck; and a hinge interconnecting the open form cleat with the mounting member for pivotal movement of the cleat between an upright and a folded position relative to the deck.

7. A hinged deck cleat assembly as defined in claim 6 wherein the hinge includes a hinge pin connected to both of the two stem sections of the cleat.

8. A hinged deck cleat assembly as defined in claim 7 wherein:

the mounting member includes a plate conformed to receive the hinge pin and allow the pin to pivot with the open form cleat between the upright and folded position;

a base plate cooperates with the conformed plate to hold the hinge pin and prevent the pin from contacting the deck; and a friction element is mounted within the hinge and engages the hinge pin to hold the cleat firmly within the contoured plate and restraint cleat movement between the upright position and folded positions.

9. A hinged deck cleat assembly as defined in claim 7 wherein the elongated contoured member forming the open form cleat is stainless steel rod.

* * * * *